United States Patent [19]

Kelly

[11] Patent Number: 5,553,737
[45] Date of Patent: Sep. 10, 1996

[54] CONTACT FEED SYSTEM

[75] Inventor: Dale D. Kelly, Wilmington, Calif.

[73] Assignee: ITT Corporation, New York, N.Y.

[21] Appl. No.: 368,933

[22] Filed: Jan. 5, 1995

[51] Int. Cl.[6] ................................................. B23Q 7/12
[52] U.S. Cl. ........................................ 221/167; 221/277
[58] Field of Search .................................. 221/168, 169,
221/167, 160, 277; 198/757, 766

[56] References Cited

U.S. PATENT DOCUMENTS

| | | | |
|---|---|---|---|
| 3,276,625 | 10/1966 | Ziskal | 221/167 |
| 4,519,524 | 5/1985 | Hirose | 221/167 |
| 4,610,345 | 9/1986 | Spreen et al. | 221/167 |

*Primary Examiner*—Kenneth Noland
*Attorney, Agent, or Firm*—Thomas L. Peterson

[57] ABSTRACT

A track assembly (34, FIG. 1) is provided for guiding electrical contacts (12) in single file movement between an outlet of a feeder bowl (14) and a final processor (42), which enables rapid changeover for feeding contacts of different sizes and shapes. The track assembly (32, FIG. 2) is a self-contained unit that includes a track housing (35) and an actuator-operated release mechanism (80) that releases a front-most of the contacts while holding back the other contacts and that includes an actuator (130) mounted on the track housing and energized by pressured air received through a conduit (136) extending to a control (140). The track assembly is detachable and reattachable as a unit from the feeder bowl and from the control, so that when larger contacts are to be fed, the track assembly can be removed and another almost identical track assembly can be installed by mechanically mounting it at the feeder bowl outlet and connecting conduits to the control.

7 Claims, 4 Drawing Sheets

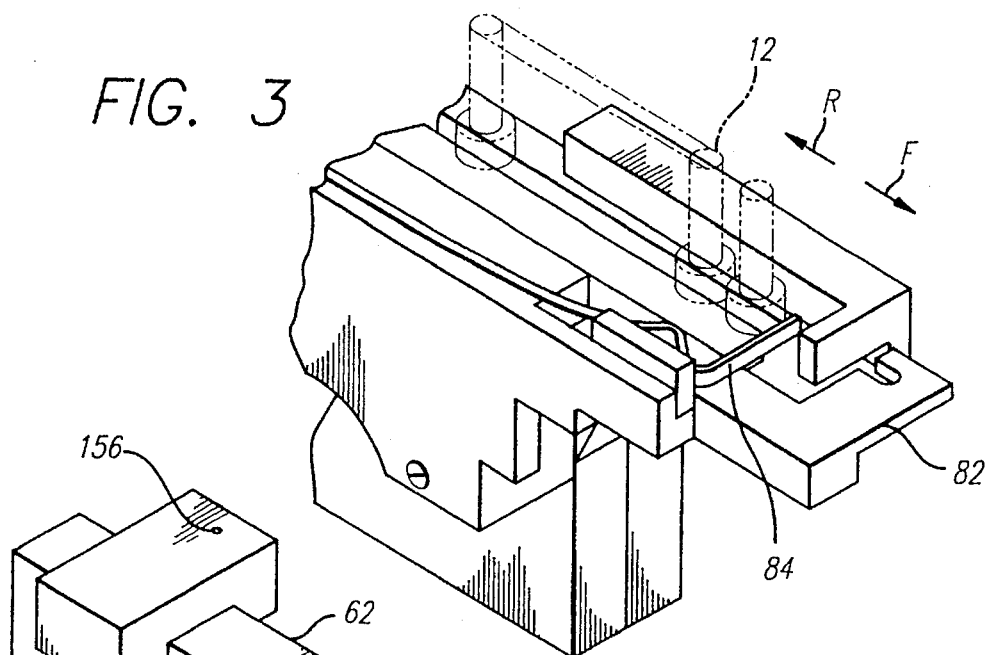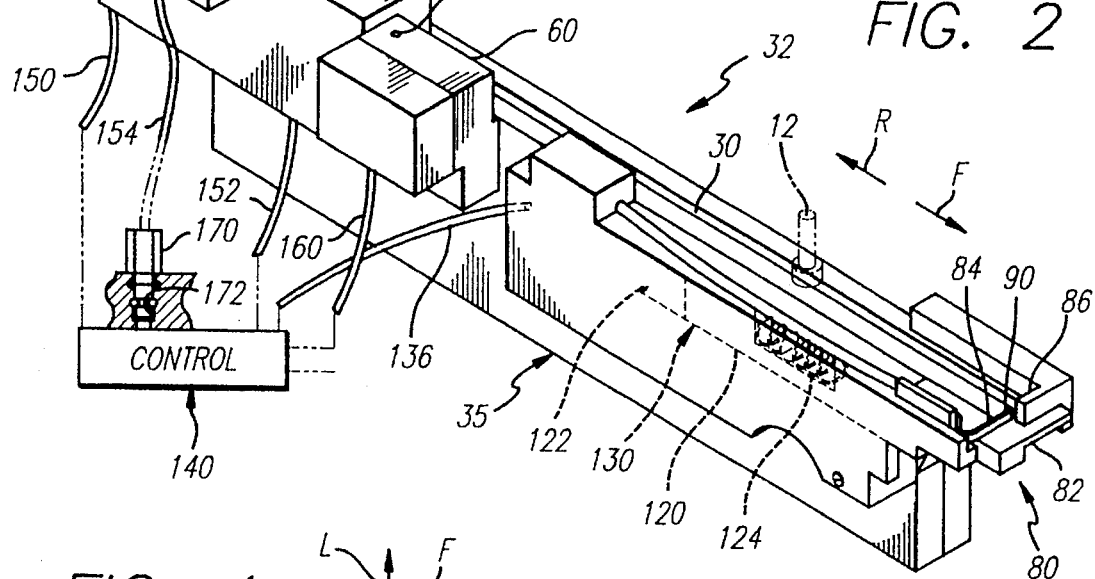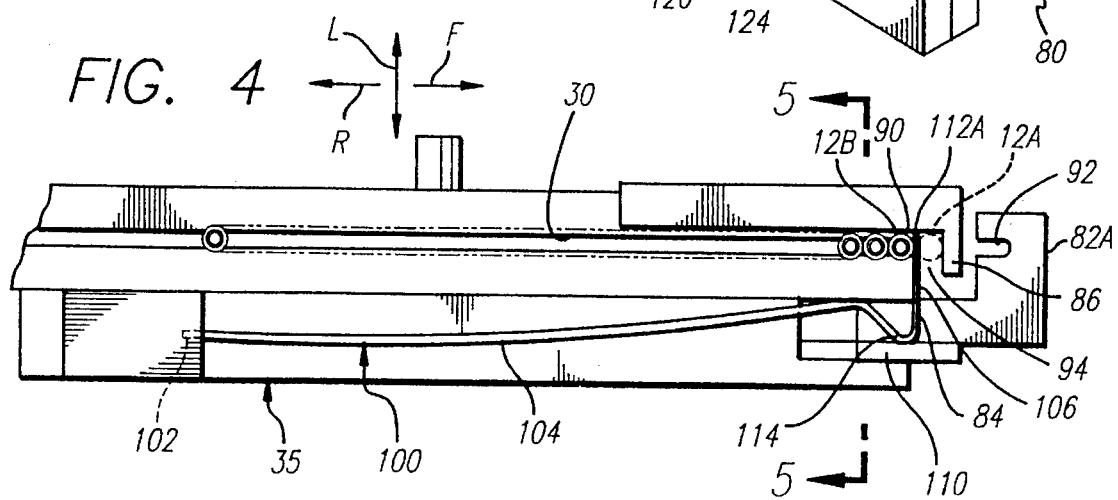

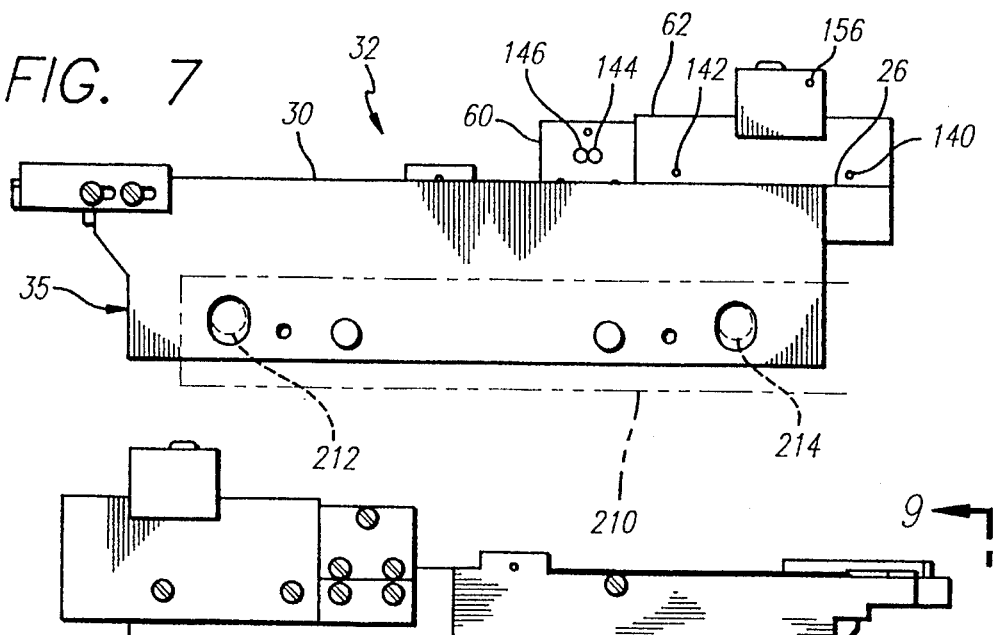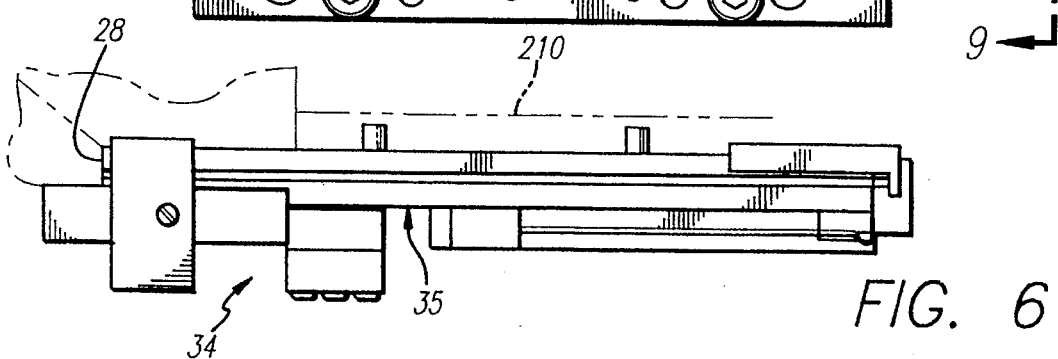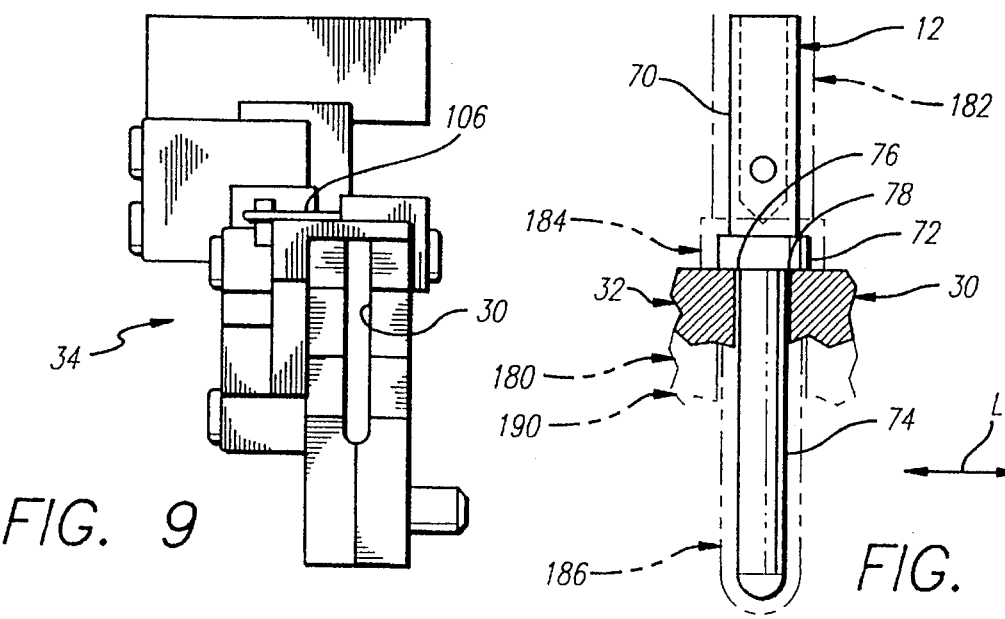

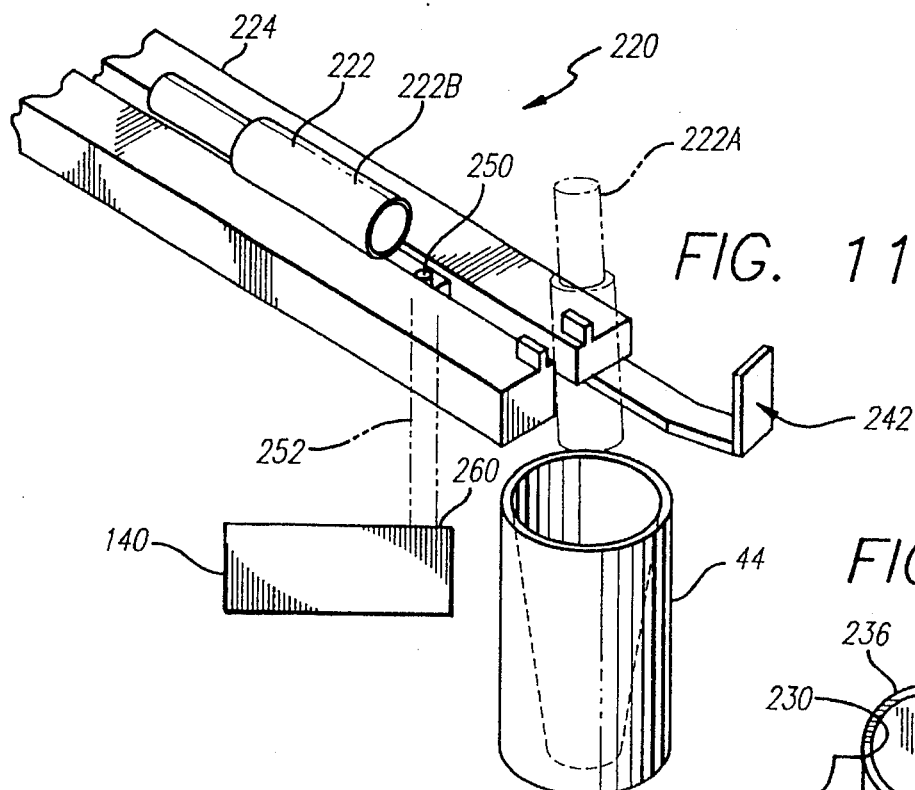
FIG. 11
FIG. 13
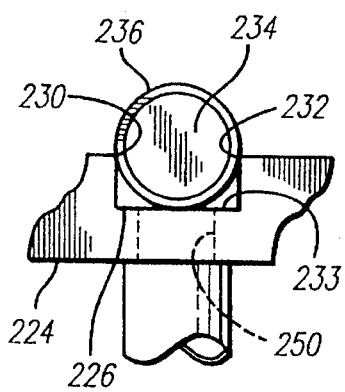
FIG. 12
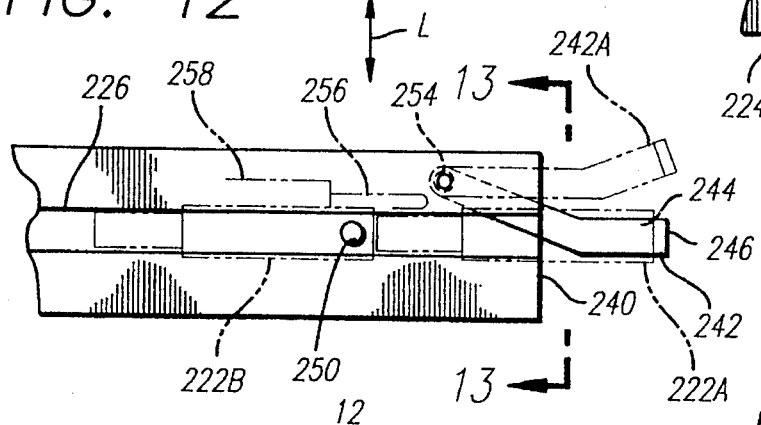
FIG. 14
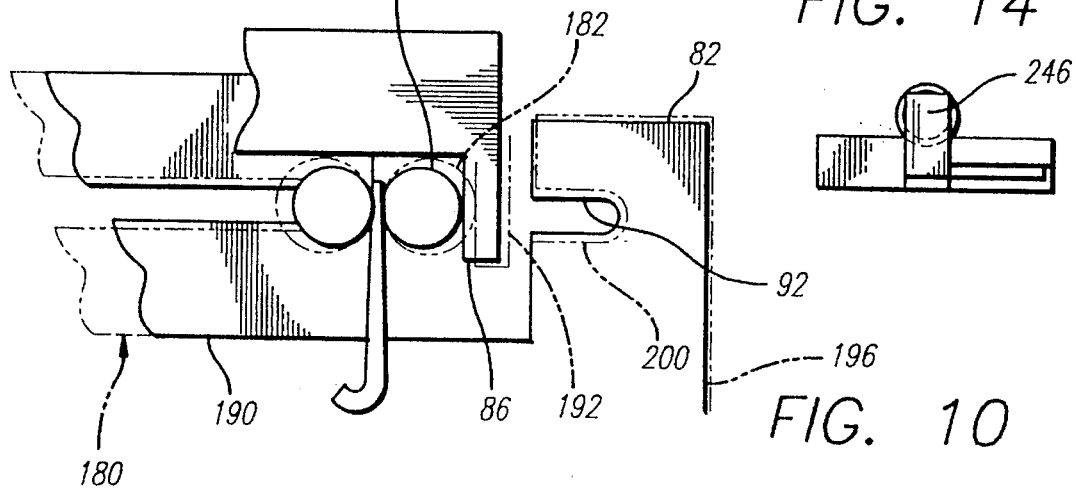
FIG. 10

CONTACT FEED SYSTEM

BACKGROUND OF THE INVENTION

Large numbers of electrical contacts can be finally processed, as by crimping a wire to each contact, by initially dumping a large number of the contacts into a feeder bowl. The feeder bowl is vibrated in a manner to advance contacts along a helical ramp to a feeder bowl outlet, with the contacts generally advancing one behind the other at the feeder bowl outlet. A mechanism lies at the feeder bowl outlet, which assures that the contacts are maintained in a predetermined orientation and lie one immediately behind another, and which, upon demand, drops one contact at a time into the final processor. The mechanism generally includes walls forming a track of predetermined width for a predetermined contact size, a vibrator which vibrates the track to advance the contacts forwardly therealong, and a pneumatically-operated mechanism which allows a single contact to fall into the final processor at selected times.

When a different size or type of electrical contact must be fed, then the track vibrator and release mechanism are detached from the track and a different size track is attached to the vibrator and release mechanism, with the release mechanism having to be adjusted for the different size of contact. Additional parts have to be detached from the old track and reattached, including a sensor that senses when the track is full and a blow off mechanism for blowing off contacts that are not properly seated onto the rear portion of the track. It requires considerable time and attention for a technician to remove various parts from the track, remove the track from the vibrator, and reattach a new track and the various parts that function with it.

SUMMARY OF THE INVENTION

In accordance with one embodiment of the present invention, a track assembly is provided for transferring electrical contacts between a feeder bowl and a final contact processor, which facilitates rapid change of the track assembly for contacts of different sizes and shapes. The track assembly includes a track housing and a release mechanism permanently mounted on the track housing for releasing a contact at the front end of the track. The entire release mechanism, including an actuator, is permanently mounted on the track housing. The track housing is mounted on an extension of the feeder bowl and conduits extending from the track housing are connected to a control that supplies energy to the actuator such as by pressured air pulses. The track assembly can be removed by merely demounting it from the feeder bowl and disconnecting conduits thereof from the control. Another track assembly for a different size contact can be installed by mounting it on the feeder bowl and connecting conduits extending from the track assembly to the control. This avoids having to disconnect, reconnect, and adjust a release mechanism and other parts.

The release mechanism includes a hold back which holds a next-to-frontmost contact from falling off the front end of the track. The release mechanism also includes a release part that forms an extension of the front end of the track, and that is moved away from the front end of the track to leave a gap thereat through which a frontmost contact can fall. In one track assembly, both the hold back and the release part are moved by a piston that is moved forwardly by the actuator. The hold back can be a flexible wire with a rear end fixed to the track housing, and with a front portion extending laterally and having a tip lying beside the front end of the track. When the piston moves forwardly, a cam on the piston deflects the front portion of the wire so the tip lies over the front end of the track to hold back the contacts.

In a track assembly for shoulderless contacts, the next-to-frontmost contact is held back by a vacuum. In that case, the length of the contact extends parallel to the length of the track, and the release moves sidewardly to leave a gap beyond the front end of the track.

The novel features of the invention are set forth with particularity in the appended claims. The invention will be best understood from the following description when read in conjunction with the accompanying drawings.

BRIEF DESCRIPTION OF THE DRAWINGS

FIG. 2 is an top and right side isometric view of the track assembly of the system of FIG. 1, shown in its initial position.

FIG. 3 is a top and right side isometric view of the front portion of the track assembly of FIG. 2, shown in its release position.

FIG. 4 is a plan view of the front portion of the track assembly shown in FIG. 3, shown in its release position.

FIG. 5 is a view taken on line 5—5 of FIG. 4, and also showing, in phantom lines, a portion of a second track assembly and of a second contact with which the second track assembly is designed to be used.

FIG. 6 is a plan view of the entire track assembly of FIG. 4, shown in its initial position, and showing, in phantom lines, the manner of its mount to a feeder bowl extension.

FIG. 7 is a left side elevation view of the track assembly of FIG. 6.

FIG. 8 is a right side elevation view of the track assembly of FIG. 6.

FIG. 9 is a front elevation view of the track assembly taken on line 9—9 of FIG. 8.

FIG. 10 is a plan view of the front portion of the track assembly of FIG. 4, and showing, in phantom lines, a similar second track assembly designed for the larger contacts that are also shown in phantom lines in FIG. 5.

FIG. 11 is a partial isometric view of a track assembly constructed in accordance with another embodiment of the invention, for use with shoulderless contacts, showing the assembly in its release position.

FIG. 12 is a plan view of the track assembly of FIG. 11, showing it in its initial position in solid lines, and in the release position in phantom lines.

FIG. 13 is a view taken on line 13—13 of FIG. 12, but without showing the release member.

FIG. 14 is a view similar to FIG. 13, but showing the release member in its initial position.

DESCRIPTION OF THE PREFERRED EMBODIMENTS

Figure 1:
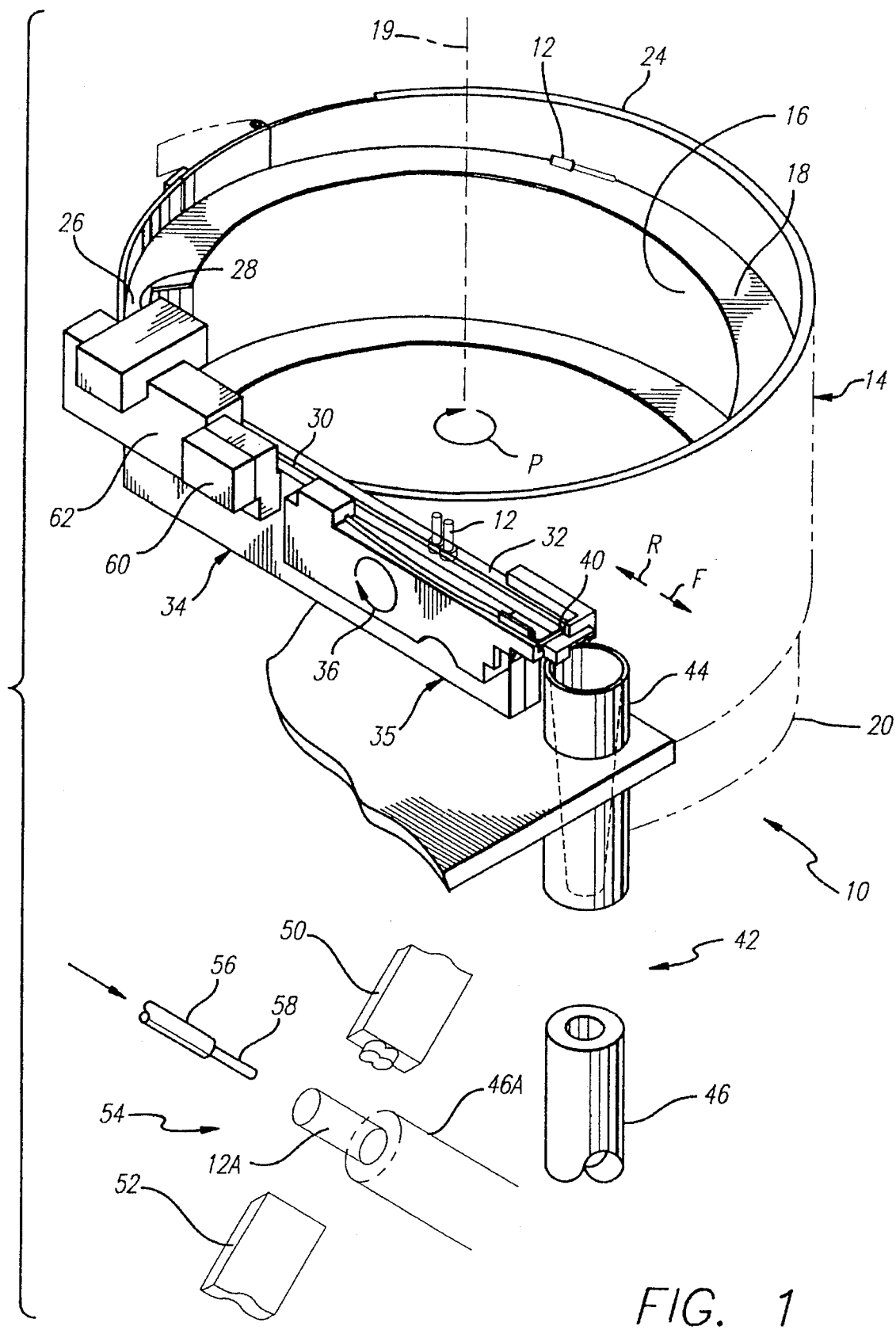
FIG. 1 is an partial isometric view of a system for moving electrical contacts constructed in accordance with one embodiment of the present invention.

FIG. 1 illustrates a system 10 for handling electrical contacts 12. A batch of such contacts, which may include hundreds or thousands of them, are dumped into a feeder bowl 14. Such feeder bowl is well known, and includes a container 16 whose bottom initially receives the contacts, a helical ramp 18 which extends around the inside of the bowl around its axis 19, and a vibrator 20 which vibrates the bowl.

The vibrator moves the bowl in a path P to cause the contacts to slowly move up the ramp. The surface of the ramp is downwardly inclined towards the outside wall 24 of the container to keep the contacts moving along the radially outer edge of the ramp. The contacts move to a feeder bowl outlet 26 and onto a rear end 28 of a track 30 of a track assembly 34.

The track 30 is vibrated as indicated at 36 to advance the contacts forwardly in the direction F, to a front end 40 of the track. At the front end of the track, individual contacts are released on demand, to fall into a final processor 42. The final processor includes a funnel 44 that directs the contacts into a locator 46. Once the locator receives a contact, the locator pivots to the position 46A wherein it holds the contact between a plurality of crimping dies 50, 52 of a crimping mechanism 54. A technician inserts a wire 56 that has a bared end at 58, into the contact at 12A. The crimping dies then move against the contact and thereby crimp the wire into the contact. The wire 56 can then be withdrawn, and will have a contact crimped to its end.

A major function of the track assembly 34 is to assure proper orientation of the contacts 12 and assure that the contacts are lined up one behind another without a gap between the contacts, before a contact is released. To this end, the track assembly includes a sensor 60 that senses the presence of contacts on the track and a blow off device 62 that blows off contacts that have not fallen into the track, so those contacts can be blown back into the container 16 of the feeder bowl.

FIG. 5 shows one of the contacts 12, which has a hollow crimp barrel 70, a shoulder 72, and a long pin end 74. The track 30 includes a pair of track edges 76, 78 which are spaced in a lateral direction L by a distance which is only slightly greater than the diameter of the contact pin end 74. The pin end 74 is solid and causes the contact to remain stably in the upright position shown in FIG. 5 as the contact moves forwardly along the track.

As shown in FIG. 2, the track assembly 32 includes a release mechanism 80 that includes a release member 82 that moves in forward and rearward directions F, R. The release mechanism also includes a hold back 84 in the form of a wire separator. Initially, the contacts 12 advance forwardly along the track 30 until they abut a stop 86 that lies a small distance beyond the front end 90 of the track. Since the forces urging the contacts forwardly are from vibration of the track, the contacts merely line up one immediately behind the other behind the stop 86. When it is desired to release a contact to fall into the final processor, the release member 82 is moved forwardly, to the position 82A shown in FIG. 4. The release member includes a short track section 92 that initially serves as an extension of the track front end 90 to support a frontmost contact 12A. When the release member is moved forwardly to the position 82A, a contact at 12B cannot move forward because of the stop 86, and is "wiped off" the track section 92. The movement of the member to the position 82A leaves a gap 94 through which the contact at 12A can fall. The contact falls into the funnel shown at 44 in FIG. 1.

When the release member moves forward to 82A (FIG.4) and leaves the gap 94, the contacts behind the frontmost one 12A continue to be urged forwardly by the vibrations. To prevent a next-to-forwardmost contact at 12B from moving into the gap, applicant provides the hold back 84 which holds back the contact 12B. The hold back is an elongated resilient element 100 in the form of a wire. The wire has a rear end 102 which is fixed to the track housing 35, and which has a middle portion 104 that extends forwardly from its rear end, and that has a front portion 106 that extends laterally, in the direction L towards the track front end 90. The release member 82A carries a cam 110 which lies adjacent to a follower part 114 of the wire. When the release member 82A moves forwardly, the cam 110 deflects the front portion 106 of the resilient element so that its tip at 112A moves to a position in line with and preferably slightly over the track front end 90. The tip at 112A can initially move between the shoulders of the frontmost and next contacts (12A, 12B) to separate them, and thereafter prevent contacts lying behind the frontmost one, from moving forwardly. The tip at 112A remains at its holding position until the release member 82A has moved back most of the way to its initial position, when the cam 110 allows the tip at 112A to move back to a position beside the track and out of the path of the forwardly moving contacts.

As shown in FIG. 2, the release member 82 is mounted on, and part of, a piston 120 which is slidable in forward and rearward directions within the track housing 35, with its rear end open to an actuator cylinder 122. The "cylinder" 122 is not necessarily of cylindrical cross section but serves to contain pressured air that urges the piston forwardly. A spring 124 returns the piston and the release member to their rearward position when pressured air is no longer applied to the cylinder and the air therein has leaked out. The pneumatic actuator 130 formed by the piston 120 and cylinder 122 is permanently fixed in the track housing 35. A conduit 136 extends from the cylinder 122 to a control 140. The control 140 senses when a contact is to be released, as when a sensor senses the full insertion of a wire into a contact held by the locator at 46A in FIG. 1, to briefly deliver a pulse of pressured air through the conduit to the actuator. The control 140 is connected to a source of pressured air (not shown). Of course, the piston could be an electrical solenoid which is electrically energized.

As shown in FIG. 7, the track assembly 32 includes an air outlet 140 that blows a stream of air at contacts moving along the feeder bowl outlet 26 to urge the contacts to tilt to an upright position so they can fall into the track 30 of the track assembly. The track assembly includes another air outlet 142 of the blow off 62, that blows off contacts that lie at the side of the track but not in the proper position where the pin ends lie within the track. As described earlier, such contacts are blown back into the feeder bowl. The sensor 60 includes a light emitter 144 and a light detector 146 which detect the presence of contacts moving along the track, to determine that the track is full of contacts so they can be reliably dispensed one at a time.

Referring again to FIG. 2, it can be seen that air conduits 150, 152 extend from the control 140 to the air outlets 140, 142. An additional air conduit 154 extends to an air outlet 156 that helps blow rejected contacts back into the feed bowl. A conduit 160 in the form of an electrical cable, carries electricity to the light emitter 144 and carries signals from the light detector back to the control. The conduit 160 has a simple three-contact plug at its end which plugs into the control. Each of the air-carrying conduits, such as 154, has an air coupling 170 that can be merely inserted into and removed from an air socket 172 on the control.

As indicated in FIG. 5, a second track assembly 180 must be substituted for the first track assembly 32, when contacts 182 having shoulders 184 of a larger diameter and pin ends 186 of larger diameter than those 72, 74 of the first contacts 12. Such second track assembly 180 will have a second track housing 190 with a larger spacing between the track edges. Also, the second track assembly will be constructed so instead of the stop at 86 (FIG. 10), a stop will lie at the position 192 to accommodate the larger contact 182. Also, the release member at 82 will be replaced by a release member 196 having a wider short track section 200.

As shown in FIGS. 6 and 7, the track housing 35 is rigidly fixed to a feeder bowl extension 210 which extends from the feeder bowl 14. As a result, the track housing 35 and all parts thereon are vibrated by the vibrator 20 that vibrates the feeder bowl. To install a new track assembly 34, applicant releases bolts or other fasteners shown at 212, 214 in FIG. 7 from the feeder bowl extension 210. Also, the various conduits shown in FIG. 2 are detached from the control 140. The new track assembly indicated at 180 in FIG. 10 is installed in place of the removed one, by first using the fasteners 212, 214 (FIG. 7) to attach the new or second track assembly to the feeder bowl extension 21 0. Then the various conduits 136, 150, 152, 154, and 160 are attached to the control 140 as shown in FIG. 2. It is not necessary to attach and accurately adjust the position of the release mechanism, because all of its parts, as well as the various air outlets and sensor, are rigidly fixed to the second track housing 190 and are part of the second track assembly.

FIG. 11 illustrates still another track assembly 220, which is designed to transfer a large number of shoulderless contacts shown at 222 so they can drop through the funnel 44 of the final processor. As shown in FIG. 13, the assembly includes a track housing 224 that includes a track 226 that lies beneath the contact along part of its path. The contact is oriented with its axis 234 parallel to the track. As shown in FIG. 12, the contacts move in single file towards a front end 240 of the track. A release member 242 forms a short track section 244 and a stop 246, with the track section 244 supporting only the bottom of the cylindrical surface of the contact. When the frontmost contact at 222A is to be released, the release member 242 moves largely laterally along the direction L to the position 242A. As shown in FIG. 11, this causes the contact 222A to tilt and fall into the funnel 44. To prevent a next-to-frontmost contact shown at 222B in FIG. 12 from advancing, applicant provides a vacuum passage opening 250. A vacuum temporarily applied at 250 prevents advancement of the contact at 222B, until the vacuum is terminated. As shown in FIG. 11, the vacuum is applied through a vacuum conduit 252 to a control 140. The release member is urged towards its initial position 242A by a short helical spring 254 (FIG. 12) and is moved from the initial position to the release position by a piston 256 of an air-energized actuator 258. The track assembly 220 can be installed in place of the track assembly 32 of FIG. 1, except that the vacuum conduit 252 must be attached to a vacuum port 260 of the control.

Thus, the invention provides a track assembly for use in advancing electrical contacts from a feeder bowl to a final processor such as a crimping station, which facilitates changeover to electrical contacts of different sizes and shapes. This is accomplished by providing a release mechanism wherein all parts thereof are movably mounted on a track housing of the track assembly. Each track assembly has its own track and release mechanism which are constructed specifically for a particular contact size and shape. A track assembly is changed by mechanically mounting a new one in its place and connecting conduits leading from the new track assembly to an existing control. The track assemblies are preferably rigidly but releasably mounted to a feeder bowl extension, so that a separate vibrator is not needed for the track assembly. In one track assembly, the release mechanism includes a piston operated release member which carries a short track section that initially lies against the front end of the track and that is thrust forwardly by a piston to release a contact. This same piston has a cam that bends a resilient member, such as a wire, so a laterally extending part of the wire moves its tip over the track end to hold back subsequent contacts. In a track assembly for shoulderless contacts, a next-to-frontmost contact is held back by a vacuum passage opening that opens between the edges of the track on which a cylindrical surface of the contact lies.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for feeding first electrical contacts of a particular shape and size, which includes a feeder bowl that advances contacts to a feeder bowl outlet, a first track assembly which includes a first track housing that forms a first track with a rear track end that is connected to said bowl outlet to receive contacts therefrom, said track being constructed to confine said contacts to a particular orientation and in single file movement in a forward direction along said track to a front track end that is spaced in a forward direction from said rear track end, with said apparatus including a final processor which processes individual ones of said contacts, characterized by:

said first track assembly includes a first release mechanism which has a moveable release member mounted on said track housing with said release member having a release end lying at said track front end and being moveable to release a contact lying at said track front end so the contact can fall into said final processor, said release mechanism including an actuator mounted on said first track housing and having a first energizing input which receives an energizing flow that operates said actuator;

said first track assembly also has a sensor that detects contacts in an improper position along said first track, and a blowoff device that blows off said track a contact that has been detected by said sensor to be in an improper position, said sensor and blowoff device having second and third energizing inputs, respectively, that each receives an energizing input;

a control which has a plurality of outputs which are detachably coupled to said first, second, and third energizing inputs;

said first track assembly, with said first track housing and said first release mechanism and said sensor and said blowoff device, being detachable and reattachable as a unit from said feeder bowl and said control.

2. The apparatus described in claim 1 including:

a second track assembly which has a second track housing forming a second track and which has a second release mechanism mounted on said second track housing, said second track assembly being attachable as a unit to said feeder bowl and said control in place of said first track assembly, with said second track assembly being similar to said first track assembly and including a second sensor and second blowoff device, but with the track of said second track assembly being wider to accommodate second contacts which are wider than said first contacts.

3. A track assembly for confining electrical contacts to single file movement, which includes a track housing having walls with a pair of laterally-spaced parallel edges and a groove between said edges forming a track with rearward and forward track ends, characterized by:

a thin elongated resilient member having a member rear end rigidly fixed to said track housing and having a front portion extending laterally toward said track front end and having a tip initially lying beside said track front end;

a pneumatic actuator lying in said track housing and having a moveable piston that has a cam engaged with said resilient member to move said tip laterally to a position substantially over said track front end to block forward movement of contacts off said track front end, said piston having a release part which forms substantially a short extension of said track that lies at an initial position immediately in front of said track front end and which is moveable away from said initial position to form a gap in front of said track front end through which a contact can fall.

4. A method for alternately feeding first and second electrical contacts from a feeder bowl outlet in single file and in a particular orientation along a track, and from the track to a final processor, where said first and second contacts each have a shoulder and a depending part but said depending part of said second contact is of greater diameter than said depending part of said first contact, comprising:

constructing a first track assembly with a first track housing forming a first pair of parallel edges that are laterally spaced by a first distance to form a first track that includes rear and front track ends, and with a release mechanism that is mounted on said track housing and that includes a moveable release member having a part lying immediately beyond said front track end and forming a track extension that supports at least part of a frontmost contact at a location beyond said track front end, and with a holdback mounted on said track housing which holds a next-to-frontmost contact from forward movement, and with an actuator fixed to said track housing and coupled to said release member and said holdback and coupled to a conduit that receives energizing energy;

coupling said first track assembly to said feeder bowl so said first track rear end is aligned with said feeder bowl outlet, and coupling said actuator conduit to a control that supplies energy along said conduit at selected times;

energizing said actuator to move said release member to move said track extension away from a position immediately forward of said track front end and to move said holdback to hold a next-to-frontmost contact, to dispense one of said first contacts;

constructing a second track assembly which is substantially identical to said first track assembly, but which has second parallel edges that are laterally spaced by a second distance which is greater that said first distance and which has a holdback constructed to hold back said second contacts;

decoupling said first track assembly from said feeder bowl and said control and coupling said second track assembly to said bowl and said control in place of said first track assembly.

5. The method described in claim 4 wherein:

said step of constructing a first track assembly with a first track housing and with a holdback and with an actuator, includes forming said holdback of a resilient wire with a largely 90° bend and fixing a rear end of said wire to said track housing while a front portion of said wire lying beyond said bend has a tip lying beside said track front end, and forming said actuator with a pneumatic cylinder lying within said first track housing and with a piston that is moveable in forward and rearward ends so said piston carries a cam which moves said front portion of said wire laterally so its tip moves to a position across said track front end, and with said piston having a front end that forms said release member.

6. Apparatus for feeding first electrical contacts of a particular shape and size, which includes a feeder bowl that advances contacts to a feeder bowl outlet, a first track assembly which includes a first track housing that forms a first track with a rear track end that is connected to said bowl outlet to receive contacts therefrom, said track having parallel but spaced edges and a groove between said edges to confine said contacts to a particular orientation and in single file movement in a forward direction along said track to a front track end that is spaced in a forward direction from said rear track end, with said apparatus including a final processor which processes individual ones of said contacts, characterized by:

said first track assembly includes a first release mechanism which has a moveable release member mounted on said track housing with said release member having a release end lying at said track front end and being moveable to release a contact lying at said track front end so the contact can fall into said final processor, said release mechanism including an actuator mounted on said first track housing and having an energizing input which receives an energizing flow that operates said actuator;

a control which has an output which is detachably coupled to said energizing input;

said first track assembly, with said first track housing and said first release mechanism, being detachable and reattachable as a unit from said feeder bowl and said control;

said first release member includes an elongated resilient element having a rear end fixed to said first track housing and having a front portion which extends primarily in a lateral direction which is perpendicular to said forward direction, with said front portion having a tip initially lying beside the front end of said first track;

said actuator of said first release mechanism includes a piston that is spring biased in a rearward direction and that is thrustable in said forward direction, said piston having a cam positioned to deflect said front portion of said resilient element so said tip moves laterally to a position substantially over said track front end to prevent forward movement of said contacts, said piston also having a release part that initially supports a contact lying forward of said track front end, said release part moving away form said front track end to leave a gap through which one of said first contacts can fall when said piston is thrust in said forward direction.

7. Apparatus for feeding first electrical contacts of a particular shape and size, which includes a feeder bowl that advances contacts to a feeder bowl outlet, a first track assembly which includes a first track housing that forms a first track with a rear track end that is connected to said bowl outlet to receive contacts therefrom, said track being constructed to confine said contacts to a particular orientation and in single file movement in a forward direction along said track to a front track end that is spaced in a forward direction from said rear track end, with said apparatus including a final processor which processes individual ones of said contacts, characterized by:

a control which has a vacuum port;

said first track is constructed to carry substantially shoulderless contacts, with said first track having a pair of parallel but spaced edges and with each of said contacts having a largest diameter cylindrical surface lying on said edges;

said first track assembly includes a release mechanism that includes a vacuum passage opening lying between said track edges at a location spaced a distance rearward of said track front end, and a vacuum conduit coupled to said vacuum passage opening and to said control vacuum port to supply a vacuum to said vacuum passage opening that stops the movement of said contacts along said track.

\* \* \* \* \*